United States Patent [19]

John

[11] Patent Number: 5,091,608
[45] Date of Patent: Feb. 25, 1992

[54] FLAME RETARDANT SPLICING SYSTEM

[75] Inventor: Günther John, St. Paul, Minn.

[73] Assignee: Minnesota Mining and Manufacturing Company, St. Paul, Minn.

[21] Appl. No.: 642,710

[22] Filed: Jan. 17, 1991

Related U.S. Application Data

[63] Continuation of Ser. No. 225,574, Jul. 27, 1988, abandoned, which is a continuation of Ser. No. 111,106, Oct. 20, 1987, abandoned, which is a continuation of Ser. No. 843,874, Mar. 25, 1986, abandoned, which is a continuation of Ser. No. 592,792, Mar. 23, 1984, abandoned.

[51] Int. Cl.$^5$ .............................................. H02G 15/08
[52] U.S. Cl. ................................ 174/84 R; 174/121 A; 252/609; 428/377; 428/389; 523/173
[58] Field of Search ............... 174/84 R, 92, 121 A; 252/609; 523/173, 179; 524/424, 430; 428/377, 389

[56] References Cited

U.S. PATENT DOCUMENTS

| | | | |
|---|---|---|---|
| 2,888,419 | 5/1959 | Safford | 524/430 |
| 2,967,795 | 1/1961 | Bollmeier et al. | 174/84 R |
| 3,419,669 | 12/1968 | Dienes | 174/84 R |
| 3,468,839 | 9/1969 | Millane | 524/424 X |
| 3,802,913 | 4/1974 | MacKenzie, Jr. | 428/389 |
| 3,912,854 | 10/1975 | Thompson et al. | 174/76 X |
| 3,914,193 | 10/1975 | Fessler et al. | 523/179 |
| 3,983,082 | 9/1976 | Pratt et al. | 523/179 |
| 4,123,586 | 10/1978 | Betts et al. | 252/609 |
| 4,150,249 | 4/1979 | Pedersen | 174/121 A X |
| 4,152,538 | 5/1979 | Gassinger et al. | 174/76 X |
| 4,237,236 | 12/1980 | Newitzki | 524/430 X |
| 4,331,733 | 5/1982 | Evans et al. | 428/379 |
| 4,341,694 | 7/1982 | Halpern | 523/179 X |
| 4,392,014 | 7/1983 | Trumble et al. | 174/92 |
| 4,405,425 | 9/1983 | Schiller et al. | 524/430 X |
| 4,456,654 | 6/1984 | Kotian | 174/120 SR X |
| 4,477,523 | 10/1984 | Biggs et al. | 428/389 |
| 4,632,946 | 12/1986 | Muench et al. | 523/179 |
| 4,678,607 | 7/1987 | Reitz | 252/609 |

FOREIGN PATENT DOCUMENTS

| | | |
|---|---|---|
| 82407 | 12/1982 | European Pat. Off. . |
| 1569123 | 1/1963 | Fed. Rep. of Germany . |
| 1494922 | 8/1963 | Fed. Rep. of Germany . |
| 1769312 | 5/1968 | Fed. Rep. of Germany . |
| 2739429 | 9/1977 | Fed. Rep. of Germany . |
| 2809294 | 2/1978 | Fed. Rep. of Germany . |
| 3228119 | 2/1984 | Fed. Rep. of Germany . |
| 3229352 | 2/1984 | Fed. Rep. of Germany . |
| 212247 | 12/1982 | Japan . |
| 2121056 | 12/1983 | United Kingdom . |
| 2128394 | 4/1984 | United Kingdom . |

*Primary Examiner*—Morris H. Nimmo
*Attorney, Agent, or Firm*—Gary L. Griswold; Walter N. Kirn; Darla P. Neaveill

[57] ABSTRACT

A cast cable connection comprising a molded plastic cable splice and a plastic wrapping, the splice containing a halogen-free synthetic resin and fire-retardant additives which will not generate toxic and/or corrosive products on exposure to flame, the wrapping comprising a halogen-free composition capable of maintaining a substantially continuous coat-like structure upon fire exposure, again without generating toxic and/or corrosive products.

11 Claims, 1 Drawing Sheet

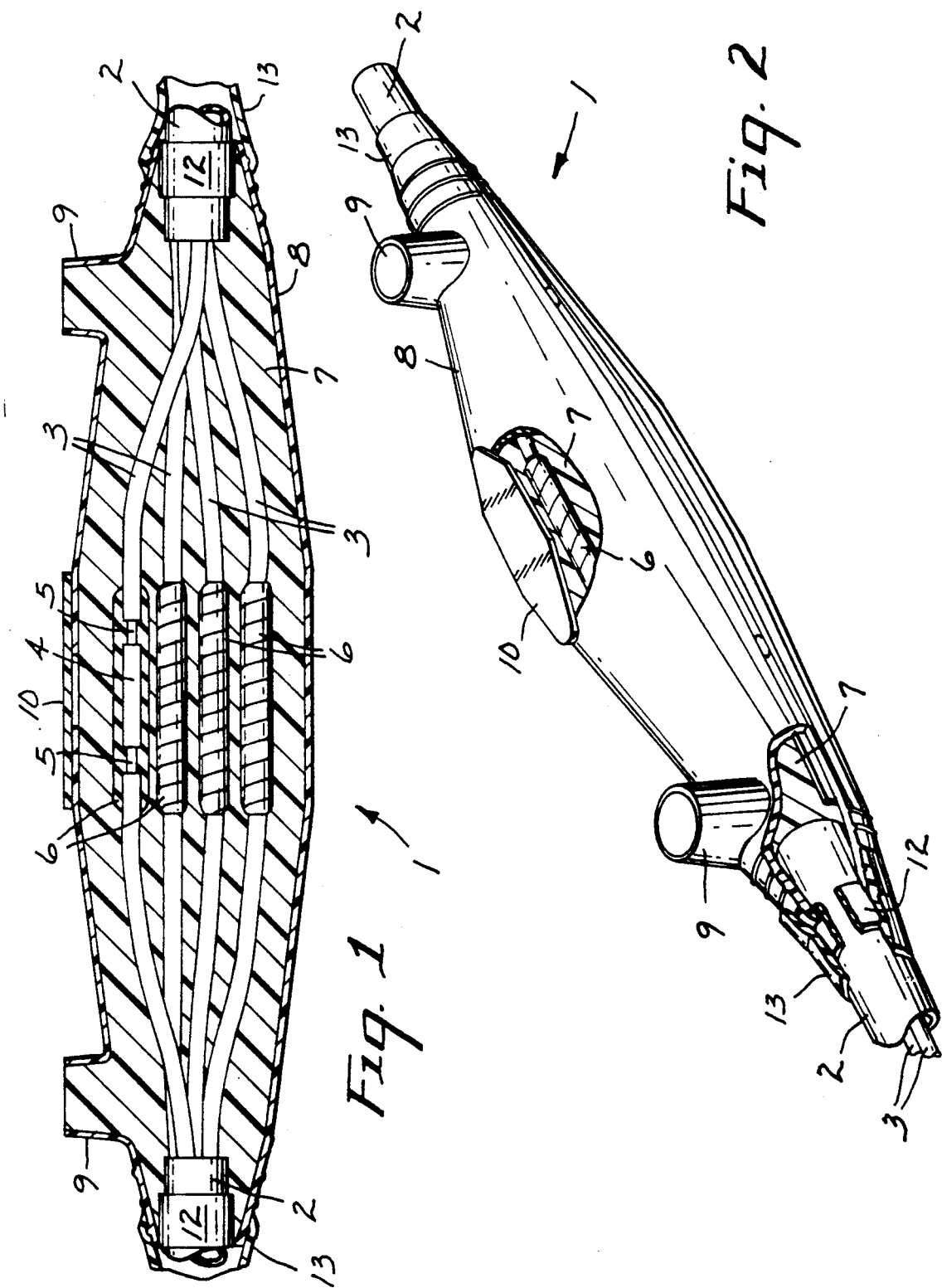

FLAME RETARDANT SPLICING SYSTEM

This is a continuation of application Ser. No. 07/225,574 filed July 27, 1988 now abandoned which is a continuation of application Ser. No. 111,106 filed Oct. 20, 1987, now abandoned which is a continuation of Ser. No. 843,874, filed Mar. 25, 1986, which is a continuation of Ser. No. 592,792, filed Mar. 23, 1984, both abandoned.

FIELD OF THE INVENTION

The invention relates to a cast cable connection consisting of a plastic wrapping and a moldable synthetic resin cable splice.

BACKGROUND ART

Synthetic resins have found a variety of applications due to their excellent processing and application-technological properties. However, except for halogen-containing resins, such as polyvinyl chloride and poly(tetrafluoroethylene) which are self-extinguishing, synthetic resins typically are flammable and support flaming combustion. For the purpose of overcoming this disadvantage, the resins are usually admixed with fire-retardant additives, the most common thereof being compounds which contain halogen, phosphorous and antimony. At elevated temperatures, these compounds split off their respective acids which effectively inhibit a continuation of flaming combustion.

In regard to the voluminous pertinent patent literature in this area, the following patents shall be cited as examples, e.g., German (OS) 15 69 123 disclosing antimony oxychloride as a fire-retardant additive and German (OS) 14 94 922 disclosing the addition of phosphine and phosphoric acid compositions.

However, fire retardants capable of splitting off an acidic compound have the obvious disadvantage that such acids are corrosive, thus possibly causing damage or destruction of electrical or electronic components, including electrical cables. Furthermore, it should be mentioned that resins rendered flame-retardant in such a manner will typically generate a considerable amount of smoke which will obviously interfere with fire-fighting and rescue operations. Besides, as determined in more recent studies, the combustion products of flame-retardant resins exhibit a considerable degree of toxicity.

According to German Patent 27 39 429, attempts have been made to resolve these disadvantages by adding an inorganic magnesium compound, an alkali chloride and an inorganic tin or vanadium compound to the synthetic resin. Besides the fact that tin and vanadium compounds represent a significant cost factor, the presence of alkali chloride, which is necessary for achievement of satisfactory flame-retardancy, cannot entirely eliminate the aforementioned disadvantages. The use of borates as flame-retardant additives has been described in the German (AS) 17 69 312. Admittingly, borates do not form a corrosive acid, but the flame-retardant effect therefrom is relatively weak, requiring the addition of another fire-retardant agent, such as antimony oxide.

Finally, German (OS) 28 09 294 should be mentioned, wherein the use of aluminum hydroxide as a halogen-free flame-retardant is described for copolymers of polyolefins and synthetic rubbers, using, as the case may be, a combination of magnesium carbonate. However, only those types of synthetic resins which permit incorporation of fillers and additives on a roller-mill can be used for admixing, without difficulties, the necessary large amounts of these flame-retardant additives.

Due to the non-availability of a suitable flame-retardant for molded plastic cable splices, such types of cable connections cannot be used in critical areas, in particular in electrical and electronic devices. Therefore, with reference to new installations, the result is that excessive lengths of cable will be consumed and, even more serious, no repair work is possible if cable damage occurs. The entire length of the damaged cable has to be replaced. Such an excessively high cable consumption is, however, uneconomical and cannot be justified.

Therefore, the present invention deals with the preparation of a cast cable connection consisting of a plastic wrapping and a molded cable splice comprising synthetic resins. This cable connection will not form corrosive products when exposed to fire and will not generate toxic by-products of combustion, but the fire-resistance thereof will be at least equal to that of resins prepared with halogen-containing fire-retardant additives. In case of fire, the cable connection will retain its function over a sufficiently long period of time.

BRIEF DESCRIPTION OF THE DRAWINGS

FIG. 1 is a side view of a case cable connection. Individual wires, joined by individual connectors are engulfed by the molded cable splice composition of the invention. The resin of the molded cable splice is confined to the volume available within the fire retardant plastic wrapping or shell. Integrity of the shell is maintained after exposure to fire by conversion of the plastic wrapping to a foamed coating which supports the cable connection.

FIG. 2 is a perspective illustration of the outer plastic wrapping which contains the molded resin. Cutaway portions of the plastic outer-wrap reveal the position of the molded cable splice resin and joined conductors.

DISCLOSURE OF THE INVENTION

The cable connection according to this invention is comprised of a plastic wrapping and a molded cable splice. The cable molding resin is halogen-free and contains a synthetic resin material and fire-retardant additives of a type to insure that no toxic and/or corrosive products are formed if the cable is exposed to fire or overheating. The plastic wrapping also consists of a halogen-free material which similarly does not generate toxic and/or corrosive products on exposure to fire, and essentially retains its continuous coat-like structure, thereby forming an insulating fire barrier. Furthermore, in the case of fire, the plastic wrapping will hold the molded cable splice in place, assuring its function, i.e., a connecting of the cable wires, and will protect the splice from being exposed to flames.

DETAILED DESCRIPTION OF THE DRAWINGS

FIGS. 1 and 2 both illustrate a case cable connection structure 1 suitable for joining cables 2 having multiple insulated wires 3. Separate cables 2 are joined using suitable connectors 4 applied to the individual conductors 5. The junctions so formed are initially protected by the application of insulative silicone rubber tape 6. The structure of the cable connection 1 is developed by engulfing the wires 3 in a flame retardant molded cable splice composition 7 which is confined to a predetermined volume defined by the shape and dimensions of a flame retardant plastic wrapping or shell 8 which is positioned around the cables 2. Ports 9 and cover 10 on plastic wrapping 8 provide entry for molded cable splice resin 7. The end portions 11 of plastic wrapping 8 encircle the cables 2 to retain the molded cable splice composition 7. A seal 12 or silicone tape is positioned within the end portions 11 of the plastic wrapping. This seal 12 is an additional means of preventing the unsolidified resin of the molded cable splice 7 from leaking past the ends 11 of the outer protective plastic wrapping 8. An additional seal 13 may be placed over the plastic wrapping 8 to further contain the resin 7. The cast cable connection 1 is completed by sealing off ports 9 and cover 10.

DETAILED DESCRIPTION

According to a preferred form of execution of the invention, the plastic wrapping consists at least of one type of synthetic resin containing at least one additive capable of forming a foamy coating structure upon exposure to fire. This synthetic resins material may be a thermoplastic or a thermoelastic (cross-linked) resin or a mixture of two or several resins from each of these classes. The preferred synthetic resin materials are thermoelastic cross-linked polymers such as modified polyolefins and similar resins, in particular cross-linked polypropylene. Thermoplastic resins, such as polypropylene, polyethylene and olefin copolymers, are particularly preferred for economical reasons.

According to another preferred form of execution of the invention, the plastic wrapping consists at least of one type of synthetic resin selected from the class of thermosetting resins such as melamine resins capable of retaining a coat-like structure upon exposure to fire.

Additives for the thermoplastic or thermoelastic resins may be any or mixtures of known propellants or blowing agents capable of splitting off nitrogen, such as melamine.

In case of fire, the blowing agent becomes active, which means nitrogen is split off, which is the best flame-retardant as commonly known. The plastic wrapping will expand while maintaining its coat-like structure and a sufficient dimensional strength. In other words, the plastic wrapping does not melt away, which would result in exposure of the molded cable splice. The coat-like structure also exhibits poor heat conductivity thereby insuring long-lasting protection of the cable splice beneath the wrapping.

According to a particularly preferred form of execution of the invention, the moldable cable splice resin consists of a two-component material based on epoxy- and/or polyester resins capable of being cured at room temperature. This resin material also contains aluminum hydroxide as a fire-retardant additive. The aluminum hydroxide preferably has a mean particle size from 8 to 60 micrometers, since such a particle size distribution allows for a particularly well homogenized dispersion in the resin. However, the mean particle size of the aluminum hydroxide may be outside of the aforementioned range without detracting from the flame-retardant effect thereof. The amount of aluminum hydroxide to be admixed is preferably in the range from about 50 to about 200 parts by weight in relation to the resin material.

To improve the fire-retardant properties even further, another form of execution of the invention deals with an additional admixing of a basic magnesium carbonate as a fire-retardant agent. The basic magnesium carbonate may be added in amounts from 5 to 100 percent by weight based on the resin material. Decreasing amounts reduce desired fire-retardancy. On the other hand, exceeding the upper limit is not recommended for process-technological reasons.

Up to now, it has not been possible to incorporate such large amounts of aluminum hydroxide into a two-component molding resin. If successful, the obtained resins could not be stored but had to be immediately processed, because the aluminum hydroxide particles tend to settle relatively fast. In order to bind eventually present residual moisture, another form of execution of the invention deals with the addition of a molecular sieve compound to the cable molding resin, such as an alkali- or earth/alkali-aluminum silicate. Due to the binding of the moisture, no change of the pH-value and/or the viscosity of the molding resin composition will occur prior to processing, which is extremely important with regard to storability.

The difficulties owing to sedimentation properties are eliminated by the addition of a wetting agent to the cable molding composition according to another preferred form of execution. This wetting agent is added in amounts from about 0.1 to 2 percent by weight. The wetting agent will displace moisture and air present on the surface of the solid additive particles and will assure perfect wetting. Any one of many known wetting agents may be employed, for example anionic wetting agents such as an alkyl sulfonate or alkyl sulfate; cationic wetting agents such as quaternary ammonium salts as obtained by alkylating long-chained tertiary amines; and non-ionic wetting agents, e.g., alkylene oxide adducts to fatty alcohols. Particularly preferred wetting agents are organo-functional silanes and quaternary ammonium salts. They exhibit particularly good wettability for aluminum oxide hydrates and basic magnesium carbonate.

Furthermore, the cable molding resin may also contain additional additives for improving processability, such as plasticizers and curing agents. Any of the known plasticizers and also any of the known hardeners or curing agents suitable for the employed resin composition may be used. With regard to epoxy resins, aliphatic or cycloaliphatic polyamines are suitable; with regard to polyester resins, peroxides are suitable.

The invention will now be further explained by the following examples without, however, limiting the scope of the invention thereto.

EXAMPLE 1

A cable molding resin was prepared from a cold-hardenable two-component resin mix of the following composition:

|  | Parts by weight |
|---|---|
| Component 1 | |
| Epoxy resin | 41.25 |
| Byk W 960, a Wetting Agent, available from Byk-Gulden Co. | 0.57 |
| Molecular Sieve | 1.48 |
| Aluminum hydroxide | 51.20 |
| Basic Magnesium carbonate | 5.20 |
|  | 100.00 |
| Component 2 | |
| N-Aminoethylpiperazine | 18.70 |
| PH 3/a5, a Plasticizer available from the VfT Co. | 19.70 |
| Byk W 960 a Wetting Agent available from Byk-Gulden Co. | 0.70 |

| | Parts by weight |
|---|---|
| Molecular Sieve | 1.85 |
| Aluminum hydroxide | 52.20 |
| Basic Magnesium carbonate | 5.85 |
| | 100.00 |

The two components were mixed by blending 50 parts by weight of component 2 with 100 parts by weight of component 1. Then, the cable wrapping was prepared by employing a melamine molding resin, type F 2210 of the Bakelite Company, into which the cable molding mix was poured.

EXAMPLE 2

A cable molding resin was prepared from a cold-hardenable two-component resin mix of the following composition:

| | Parts by weight |
|---|---|
| Component 1 | |
| Epoxy resin | 30.00 |
| Byk W 960, a Wetting Agent available from Byk-Gulden Co. | 0.62 |
| Molecular Sieve | 1.70 |
| Aluminum hydroxide | 52.00 |
| Basic Magnesium carbonate | 15.68 |
| | 100.00 |
| Component 2 | |
| Isophoronediamine | 13.50 |
| PH 3/a5, a Plasticizer available from the Vft Co. | 28.50 |
| Byk W 960, a Wetting Agent available from Byk-Gulden Co. | 0.55 |
| Molecular Sieve | 1.80 |
| Aluminum hydroxide | 20.25 |
| Basic Magnesium carbonate | 35.40 |
| | 100.00 |

The two components were mixed blending 55 parts by weight of component 2 with 100 parts by weight of component 1. This cable resin mix was poured into a cable wrapping of polypropylene, type Moplen ×94 J of the Montepolimeri Company.

EXAMPLE 3

Example 2 was repeated but a cable wrapping of polypropylene type Moplen ×94 J/N of the Montepolimeri Company, was used.

EXAMPLE 4

A cable molding resin was prepared from a cold-hardenable two-component resin mix of the following composition:

| | Parts by weight |
|---|---|
| Component 1 | |
| Polyester resin | 40.00 |
| Byk W 920, a Wetting Agent available from the Byk-Gulden Co. | 0.50 |
| Molecular Sieve | 1.50 |
| Aluminum hydroxide | 48.00 |
| Basic Magnesium carbonate | 9.00 |
| One percent by weight solution of cobalt octoate | 0.10 |
| | 100.00 |
| Component 2 | |
| Methyl ethyl ketone peroxide | 100.00 |

EXAMPLE 5

Example 4 was repeated with the exception that a wrapping of polypropylene, type Moplen ×94 J/N was used which was cross-linked by means of peroxides.

Cable connections prepared according to the aforementioned examples were exposed to an open flame. There was practically no smoke generation. The cable wrapping retained its coat-like structure. The escaping gases displayed no corrosive effects.

A cast cable connection according to the invention meets the requirements insofar as no corrosive products, no toxic products and also practically no smoke are formed in case of fire or on exposure to elevated temperatures. Due to the combined effects of high flame resistance and the heat-barrier formed by the coat-like wrappings around the cable cast, the functions of the cable within the cable splice remain intact over a sufficiently long period of time. Therefore, a cast cable connection can now also be employed in those electric installations where improved flame resistance in event of fire is necessary.

I claim:

1. A cast cable connection suitable for the enclosure of electrical conductors contained therein comprised of a plastic wrapping and a molded plastic cable splice, said cable splice comprising a known halogen-free synthetic resin and fire-retardant additives which do not generate toxic and/or corrosive products if exposed to fire and said wrapping comprising a halogen-free material capable of maintaining an essentially continuous coat-like structure when exposed to fire without generating any toxic or corrosive products, wherein said wrapping further comprises a synthetic resin material selected from the group consisting of thermoplastic resins and thermoelastic resins which contain at least one additive capable of forming a foamy coating structure on exposure to fire.

2. A cable connection according to claim 1 wherein said wrapping comprises at least one thermosetting resin material capable of retaining a coat-like structure on exposure to fire.

3. A cable connection according to claim 1 wherein said synthetic resin material is selected from the group consisting of melamine resins, polypropylene, cross-linked polypropylene and mixtures thereof.

4. A cable connection according to claim 1 wherein said plastic cable splice is formed from a two-component cable resin material selected from the group consisting of epoxy resins and polyester resins which are hardenable at room temperature.

5. A cable connection according to claim 1 wherein said plastic cable splice further contains aluminum hydroxide.

6. A cable connection according to claim 5 wherein said aluminum hydroxide has a particle size from about 8 to about 60 micrometers.

7. A cable connection according to claim 5 wherein said plastic cable splice contains about 50 to about 200 parts by weight aluminum hydroxide per 100 parts by weight resin.

8. A cable connection according to claim 5 wherein said plastic cable splice further contains about 5 to about 100 parts by weight of basic magnesium carbonate per 100 parts by weight resin.

9. A cable connection according to claim 5 wherein said plastic cable splice further contains about 0.1 to about 2 percent by weight of a wetting agent.

10. A cable connection according to claim 9 wherein said wetting agent is selected from the group consisting of organo-functional silanes and quaternary ammonium salts.

11. A cable connection according to claim 1 wherein said plastic cable splice further contains processing additives selected from the group consisting of molecular sieves, plasticizers, and hardening agents.

* * * * *